United States Patent Office 3,732,182
Patented May 8, 1973

3,732,182
PROCESS FOR PREPARING LINEAR
POLYESTERS
Kazuya Chimura, Kazuo Ito, Shunichi Takashima, Yoshihiro Shimoshinbara, and Mizuo Shindo, Otake, Japan, assignors to Mitsubishi Rayon Company Limited
No Drawing. Filed Apr. 20, 1971, Ser. No. 135,751
Claims priority, application Japan, May 1, 1970, 45/36,833; May 9, 1970, 45/39,045; May 19, 1970, 45/42,773; June 5, 1970, 45/48,506; Oct. 22, 1970, 45/93,095
Int. Cl. C08g 17/015
U.S. Cl. 260—75 R      13 Claims

ABSTRACT OF THE DISCLOSURE

A process for preparing linear polyesters wherein polycondensation of glycol terephthalates is performed in the presence of a novel catalytic antimony compound prepared from an antimony compound having the formula $Sb(OR_1)(OR_2)(OR_3)$, such as Sb alkoxide, and $\alpha$-hydroxycarboxylic acid and/or $\alpha,\beta$ - dicarboxylic acid. Resultant polyesters exhibit excellent whiteness and transparency and therefore, are particularly useful for textile fibers and films.

---

The present invention relates to a process for preparing colorless linear polyesters and copolyesters by using a novel catalytic antimony compound. More particularly, it relates to a process for preparing linear polyesters and copolyesters having improved whiteness and transparency, i.e. in which darkening or color formation inevitably caused by using conventional catalytic antimony compounds are obviated, with an increased productivity by using antimony salt of $\alpha$-hydroxycarboxylic acid and/or $\alpha,\beta$-dicarboxylic acid as a polycondensation catalyst.

Linear polyethylene terephthalate and copolyesters containing an ethylene terephthalate chain as a main component are particularly useful for textile fibers, film or molded articles. These polyesters are normally prepared through two reaction stages, that is, the first stage wherein, for example, dialkyl terephthalate is subjected to esterinterchange with ethylene glycol or terephthalic acid is directly esterified with ethylene glycol to be converted into bis-$\beta$-hydroxyethyl terephthalate or a low molecular weight polymer thereof and the second stage wherein the bis - $\beta$-hydroxyethyl terephthalate or its low molecular weight polymer is polycondensed at high temperatures under reduced pressure to form a high molecular weight polyester. Selection of appropriate catalysts is essential to smoothly carry out both reactions in a reasonable time and to obtain a commercially valuable product. In other words, catalysts to be used have a great influence on not only productivity but also qualities of the resultant polymer such as whiteness, transparency, heat resistance, weathering resistance, stability at the time of processing and the like, as is well-known. Therefore, an elaborate consideration should be given for the selection of catalysts.

Referring to the second stage (polycondensation stage) catalysts, there are a number of known catalysts including various metallic and non-metallic compounds, among which, antimony compounds and germanium compounds are practically employed in the production of polyesters on the commercial scale. Antimony compounds have been used primarily because of their improved catalytic effect and low cost, but there is still a problem. That is, polyesters prepared by using conventional antimony compounds such as antimony trioxide are tinged with undesirable grey or greenish grey, which is due to the metallic antimony deposited by the reduction of the catalytic antimony compound during polycondensation, although the polyesters are superior in heat resistance and stability at processing. The color formation is particularly important in the case where polyesters are to be used as textile fibers, films and the like because it leads to a considerable reduction of transparency in the case of films and to a considerable reduction of whiteness in the case of textile fibers resulting in the deterioration of brilliancy in a dyeing process.

Thus, to avoid the problem, several new antimony catalysts have been heretofore proposed, including, for example, such pentavalent compounds as described in Japanese patent publications 10847/1961 and 6397/1964; pentavalent organo-antimony compounds having the formula $R_3SbO$ or $R_3Sb(OH)_2$, as described in Japanese patent publication 15999/1968; siloxy-antimony compound having the formula $(R_xR_yR_zSiO_m)_n$—Sb[III], as described in Japanese patent publication 351/1970; and antimony salts of aliphatic mono carboxylic acid having at least 12 carbon atoms, as described in British Patent 1,168,149.

These antimony compounds, however, while being effective for minimizing or avoiding the color formation or darkening of polyesters, have some disadvantages; the pentavalent antimony compounds readily cause side reactions to form undesirable products such as diethylene glycol, which is vigorous in comparison with trivalent antimony compounds; the pentavalent organoantimony compounds and the siloxy-antimony compounds are too expensive because of organometallic compounds; and the antimony salts of aliphatic monocarboxylic acid having at least 12 carbon atoms are slightly effective for minimizing the color formation and should be used in great amounts in comparison with trivalent antimony compounds to ensure the reasonable rate of polycondensation. Accordingly, these antimony compounds are also unsatisfactory as catalysts to be used in the manufacture of polyesters.

Fundamentally, in order to minimize the color formation or darkening of the polyesters, such antimony compounds wherein reduction potential thereof to metallic antimony can be maintained at a higher level during polycondensation than those of conventional trivalent antimony compounds, should be used. That is, antimony compounds to be used as a polycondensation catalyst should not have a tendency to be readily reduced in the polycondensation system. The above-mentioned antimony compounds satisfy such a prerequisite.

Thus, to avoid the above-mentioned and other problems, a process for preparing improved linear polyesters and copolyesters, which are substantially colorless and have excellent whiteness and transparency and therefore, patricularly useful for the preparation of films and textile fibers, has now been found.

According to the present invention, a process for preparing linear polyesters comprising condensing glycol terephthalate in the presence of at least one catalytic antimony compound selected from the group consisting of condensed products between an $\alpha$-hydroxycarboxylic acid having 2 to 30 carbon atoms and/or an $\alpha,\beta$-dicarboxylic acid having 4 to 30 carbon atoms and an antimony compound represented by the following formula

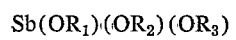

wherein $R_1$, $R_2$ and $R_3$ are identical with or different from each other and are a hydrogen atom or alkyl, acyl, hydroxyalkyl or substituted or unsubstituted aryl group, said alkyl, acyl and hydroxyalkyl groups having 1 to 18 carbon atoms and said aryl groups having 6 to 18 carbon atoms; or partially hydrolyzed products of said condensed products, is provided.

Glycol terephthalates, which are to be condensed according to the present invention, may be prepared by the direct esterification of terephthalic acid with a glycol or the ester-interchange of a lower dialkyl ester of terephthalic acid with glycol in a usual manner. Suitable glycols to be used for the esterification or the ester-interchange are those having 2 to 16 carbon atoms, which include, for example, ethylene glycol, 1,4-butanediol, cyclohexane-1,4-dimethanol and mixtures thereof. The esterification or ester-interchange of glycols, which is a precursory process of the polycondensation of the present invention, can be performed in normal manners in the presence of various known catalysts.

Glycol terephthalate to be condensed according to the present invention, may be used alone or as an admixture with each other or with minor amounts of copolycondensation component such as phthalates, isophthalates, adipates, succinates and 4-β-oxyethoxybenzoates, of ethylene glycol, 1,4-butanediol, cyclohexane-1,4-dimethanol and the like.

Antimony compounds to be used for the preparation of a catalytic antimony compound of the present invention are those represented by the formula $$Sb(OR_1)(OR_2)(OR_3)$$

wherein $R_1$, $R_2$ and $R_3$ are identical with or different from each other and are a hydrogen atom or alkyl, acyl, hydroxyalkyl or substituted or unsubstituted aryl group, which alkyl, acyl and hydroxyalkyl groups have 1 to 18 carbon atoms and which aryl groups having 6 to 18 carbon atoms, the substituted aryl group having a substituent such as phenyl, naphthyl, methylphenyl, ethylphenyl, chlorophenyl, dimethylphenyl, methoxyphenyl and the like. Such antimony compounds include, for example, trimethyl antimonite, triethyl antimonite, tripropyl antimonite, tributyl antimonite, trihexyl antimonite, trioctyl antimonite, tridodecyl antimonite, diethyl methyl antimonite, tricyclohexyl antimonite, diethyl acetyl antimonite, diethyl phenyl antimonite and the like.

α-Hydroxycarboxylic acids to be used for the preparation of a catalytic antimony compound of the present invention together with antimony compounds having the formula $Sb(OR_1)(OR_2)(OR_3)$ are those having 2 to 30 carbon atoms, which include, for example, glycolic acid, lactic acid, α-hydroxystearic acid and α-hydroxyisobutyric acid. But, those which have either a total of at least three hydroxyl and carboxyl groups or at least one aromatic ring in the α-position in relation to the carboxyl group, are particularly preferred in the present invention. Preferable α-hydroxycarboxylic acids include, for example, malic acid, α-methylmalic acid, citric acid, tartaric acid, α-methyltartaric acid, α-hydroxy-α'-methylsuccinic acid, α-hydroxyglutaric acid, glyceric acid, α,β-dihydroxyisobutyric acid, dihydroxyfumaric acid, gluconic acid, tartronic acid, benzilic acid, α-phenyllactic acid and mixtures thereof.

Preferred embodiments of the preparation of catalytic antimony compounds from α-hydroxycarboxylic acid will be illustrated.

For example, antimony tartrate compound represented by the formula $C_2H_5O$—$Sb(C_4H_4O_6)$ may be prepared as follows: 257 g. (1 mol) of antimony triethoxide is dissolved in 1 l. of ethanol. To the solution, a solution of 150 g. (1 mol) of tartaric acid dissolved in 2 l. of ethanol was dropped at temperatures from 50 to 60° C. under a nitrogen stream to form the desired product as white precipitates. Quantitative yield is almost completely achieved and the results of the elementary analysis almost agree with the theoretical value calculated from the formula $C_2H_5O$—$Sb(C_4H_4O_6)$, as shown below.

Elements.—Measured value (percent by weight): C, 22.76; H, 2.70; Sb, 39.00. Calculated value (percent by weight): C, 22.86; H, 2.86; Sb, 38.73.

The infrared analysis reveals that the product exhibits strong absorption bands at 1645 cm.⁻¹ and 1745 cm.⁻¹, both being based upon the COO antisymmetric stretching vibration of carboxyl group bonded with an antimony atom and a free carboxyl group, respectively. Therefore, the product is presumed to have a heterocyclic ring containing an antimony atom in the nucleus, as shown below.

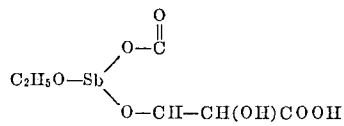

or

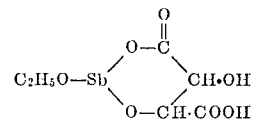

As a modification of the above embodiment, in the case where antimony triethoxide is reacted with tartaric acid in a molar proportion of the triethoxide to the acid being 1:2, reaction is performed according to the following formula:

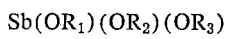

$2(C_2H_5O)_3Sb + \begin{array}{c} CH(OH)COOH \\ | \\ CH(OH)COOH \end{array} \xrightarrow{EtOH}$ $(C_2H_5O \cdot Sb)_2(C_4H_2O_6) + 4C_2H_5OH$ The resultant compound is presumed to have the following structural formula:

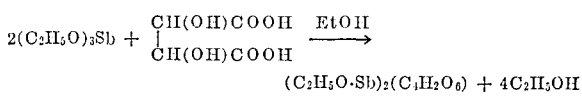

or

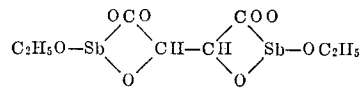

All the antimony compounds, thus prepared by the condensation between an antimony compound represented by the formula $Sb(OR_1)(OR_2)(OR_3)$ and α-hydroxycarboxylic acid, are readily soluble in ethylene glycol and polycondensation mixture of the present invention and insoluble in water.

The resultant antimony compounds, when they are heated together with water to a boiling temperature, are partially hydrolyzed to be converted into, for example, antimony tartrate compounds represented by the formulae $[(C_4H_4O_6)Sb]_2O$ and $(C_4H_2O_6)Sb_2O$, respectively, in the case of the above-exemplified two compounds $$C_2H_5O—Sb(C_4H_4O)$$

and $(C_2H_5O \cdot Sb)_2(C_4H_2O_6)$.

These partially hydrolyzed products are also soluble in hot ethylene glycol. They also exhibit superior catalyst activity for polycondensation of the present invention. From, infrared analysis, it has been found that the partially hydrolyzed products, for example, the above-exemplified compounds $(C_4H_2O_6)Sb_2O$ exhibit a strong absorption band within the range from 1580 to 1640 cm.⁻¹, which is due to the COO antisymmetric stretching vibration of the carboxyl group, but, do not exhibit any absorption band in the vicinity of 1740 cm.⁻¹, which is due to a free carboxyl group. The partially hydrolyzed product is, therefore, presumed to have heterocyclic rings containing antimony atom in the nucleus, as shown below.

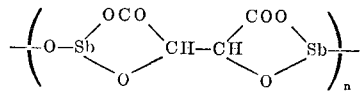

or

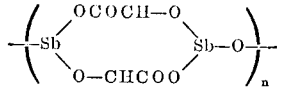

It is surprising that the catalytic condensation products of the present invention are resistant to hydrolysis, which stability cannot be observed in normal antimony salts of monocarboxylic acid such as antimony acetate and antimony alkoxide and supports a view that the condensation products of both the antimony compound and α-hydroxycarboxylic acid have a heterocyclic ring containing an antimony atom in the nucleus.

Heretofore, some antimony compounds, being similar to catalytic antimony compounds of the present invention, have been proposed as catalysts for the polycondensation of terephthalates, i.e. tartar emetic as disclosed in Japanese patent publication 8594/1956 and sodium antimonyl tartrate as disclosed in British Pat. 1,168,149, both compounds being represented by the following rational formulae:

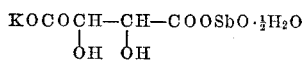

and

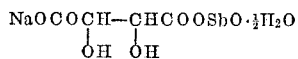

respectively.

These water-soluble double salts, however, when they are employed as a polycondensation catalyst, cause some problems; darkening of the resultant polyester is rather prominent in comparison with conventional antimony trioxide catalyst. Further, they result in polyesters possessing a distinctly yellow color. Furthermore, in case they are used in a solid form, undesirable coarse particles, being insoluble in the reaction system, are often produced in the reaction system. It is, accordingly, not too much to say that these catalysts are not more effective than conventional antimony trioxide.

Whereas, antimony tartrate compounds, which are prepared from tartaric acid and the antimony compound having the formula $Sb(OR_1)(OR_2)(OR_3)$ according to the present invention, are by far more effective than the above double salts of tartaric acid and further, exhibit by far greater catalyst activity and result in polyesters possessing more improved whiteness and transparency than those obtained from antimony trioxide. These facts possibly prove that the antimony tartrate compounds of the present invention are different in chemical structure from the known antimony tartrate compounds.

α,β-Dicarboxylic acids to be used for the preparation of a catalytic antimony compound of the present invention in place of or, in a few cases, in addition to the above-mentioned α-hydroxycarboxylic acid are those having 4 to 30 carbon atoms which are selected from the compounds represented by the following formulae and their functional derivatives.

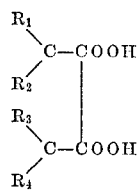

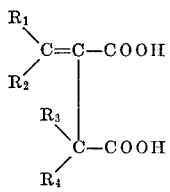

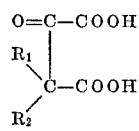

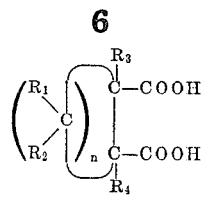

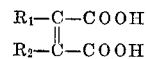

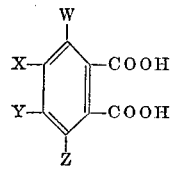

wherein $R_1$, $R_2$, $R_3$ and $R_4$ are identical with or different from each other and selected from a hydrogen atom and unsubstituted or substituted alkyl, cycloalkyl, aryl, aralkyl, allyl and alkoxyl groups, said substituted groups having a substituent selected from carbonyl group, halogen and carboxyl groups; W, X, Y and Z are identical with or different from each other and selected from a hydrogen atom and alkyl, hydroxyl and carboxyl groups; and $n$ is an integer of at least 1.

Such α,β-dicarboxylic acids include, for example, maleic acid, dimethylmaleic acid, phenylmaleic acid, fumaric acid, succinic acid, methylsuccinic acid, 2-methyl-3-ethylsuccinic acid, tetramethylsuccinic acid, phenylsuccinic acid, cyclohexylsuccinic acid, ethoxysuccinic acid, itaconic acid, cyclopropane-1,2-dicarboxylic acid, 1-phenylcyclopropane-2,3-dicarboxylic acid, cyclobutane-1,2-dicarboxylic acid, 1,2-dimethylcyclobutane-3,4-dicarboxylic acid, cyclopentane-1,2-dicarboxylic acid, cyclohexane-1,2-dicarboxylic acid, oxalacetic acid, phthalic acid, 3-methylphthalic acid, 4,5-dimethylphthalic acid, 4-hydroxyphthalic acid, trimellitic acid, 1-butene-2,3,4-tricarboxylic acid, pyromellitic acid and mixtures thereof.

The preparation of catalytic antimony compounds of the present invention from these α,β-dicarboxylic acids and antimony compounds having the formula $$Sb(OR_1)(OR_2)(OR_3)$$

may be carried out in the identical manner as those from α-hydroxycarboxylic acids, mentioned above.

For example, an antimony itaconate compound represented by the formula $C_2H_5O\text{—}Sb(C_5H_4O_4)$ may be prepared without difficulty by reacting equimolar amounts of antimony triethoxide and itaconic acid with each other in ethanol.

It is difficult to determine the definite chemical structure of the resultant catalytic compound, but, it is also presumed that it has a heterocyclic ring containing an antimony atom in the nucleus, as shown below,

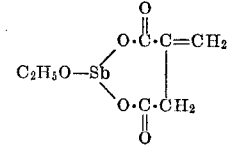

which is led from the results of infrared analysis and a fact that the catalytic compound, when it is used as a polycondensation catalyst, results in polyesters, by far, less darkened or colored than those achieved by conventional antimony catalysts such as antimony trioxide and antimony acetate and exhibits a higher catalyst activity than known antimony salts of carboxylic acid such as antimony acetate.

The catalytic antimony compound is also partially hydrolyzed to be converted into an itaconate compound, being presumed to have the formula;

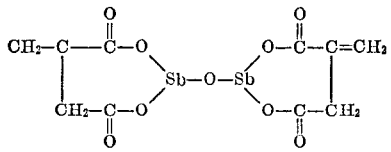

which formula agrees with the results of elementary analysis of the itaconate compound, thus obtained. Such partially hydrolyzed antimony compounds are also effective as catalysts according to the present invention.

From various $\alpha,\beta$ - dicarboxylic acids other than the above-exemplified itaconic acid, catalytic antimony compounds of the present invention may be prepared in quite the same manner.

Antimony compounds having the formula $$Sb(OR_1)(OR_2)(OR_3)$$

and $\alpha$-hydroxycarboxylic acid and/or $\alpha,\beta$-dicarboxylic acid are reacted with each other in such proportions that molar ratio of an antimony atom contained in the antimony compounds to the acid unit ranges from 1:0.5 to 1:3. Most preferably, the molar ratio is approximately 1:1. When a molar number of $\alpha$-hydroxycarboxylic and/ or $\alpha,\beta$-dicarboxylic acid unit exceeds three times a molar number of the antimony atom, unreacted acid remains in the product, which leads to discoloration, e.g. yellowing of the polymer. On the other hand, when a molar number of $\alpha$-hydroxycarboxylic acid unit is less than one-half that of the antimony atom, the color formation or darkening of the polymer becomes conspicuous and reproductivity of the resulting catalytic antimony compound is made insecure. The causes of the phenomena remaining unexplained are revealed, but it may be presumed that the phenomena are due to the fact that residual unreacted antimony raw materials, e.g. antimony triethoxide, remaining in the reaction products, have poor heat stability and a tendency to hydrolyze.

Condensed products of an antimony compound and $\alpha$-hydroxycarboxylic acid and/or $\alpha,\beta$-dicarboxylic acid may be employed as an isolated and refined compound or as a mixture comprising the condensed compound, unreacted antimony compound and the acid. Even in case they are employed as the mixture, polyesters possessing considerably reduced darkness are obtainable, but it becomes difficult, to some extent, to strictly regulate the Sb amount in the catalyst system. It is, therefore, rather inexpedient that a molar ratio of the antimony atom to the acid in the reaction system leans to both extremes; the ratio is preferably within the range from 1:0.5 to 1:3 and most preferably, 1:1, as described before.

Catalytic antimony compounds, thus obtained, may be used alone or as an admixture with each other for the polycondensation. Further, they may be used together with other known polycondensation catalysts. The known catalysts to be used in addition to the antimony compounds of the present invention include, for example, compounds containing zinc, silicone, germanium, tin, lead, titanium and the like, among which germanium compounds are most preferable because their addition together with the antimony compounds results in polyesters possessing excellent whiteness and transparency and high productivity.

Suitable germanium compounds include, for example, amorphous or crystal germanium dioxide, an eutectic mixture of crystal germanium dioxide and antimony trioxide, germanium alkoxide and its derivatives such as germanium ethylene glycolate, germanium carboxylate such as the acetate, germanium tetrahalide such as the tetrachloride and other known germanium compounds being readily and uniformly soluble in ethylene glycol or in the reaction mixture. These compounds are preferably employed in the form of, for example, amorphous germanium dioxide, solid such as finely powdered crystal germanium dioxide having an average particle size of no more than $3\mu$; an aqueous solution; an ethylene glycol solution being prepared by replacing the medium of an aqueous germanium solution or by directly dissolving germanium compounds in ethylene glycol in the presence of alkali metal salt or alkaline earth metal salt. Amounts of the known metal catalyst to be used in combination with the antimony catalyst of the present invention are not critical.

The catalytic antimony compounds may be used for the polycondensation in normal manners; just like conventional catalytic antimony compounds such as antimony trioxide. They may be added to the reaction mixture at any stage from the time before the first stage esterification or ester-interchange commences to the time while the second stage polycondensation is going on, and in any form, i.e. as a solution in ethylene glycol, a slurry in ethylene glycol or a solid form.

It is, however, most desirable to add the catalytic antimony compound in a form of solution or slurry in ethylene glycol to glycol terephthalates, produced by the esterification or ester-interchange, after the esterification or ester-interchange catalyst is inactivated by the addition of phosphorus compounds, but before polycondensation commences. Preferable amounts of the catalytic antimony compound to be added to the reaction system are from 0.005 to 0.5% by weight, based on the weight of the resulting polyester.

Preferable phosphorus compounds to be added to inactivate the esterification or ester-interchange catalyst are lower alcohol esters of pentavalent phosphoric acid or reaction products of the esters and ethylene glycol. Trivalent phosphorus compounds are not preferable because these compounds have a high reducing power and therefore, in case they are present in the polycondensation system, reduce the antimony catalyst, which possibly leads to some darkening of the resulting polyesters. The catalytic antimony compounds of the present invention appears to exhibit a remarkably high reduction potential to metallic antimony in the polycondensation system in comparison with those of conventional catalytic antimony compounds such as antimony trioxide and antimony acetate and therefore, even in the case where trivalent phosphorus compounds are used together, it results in polyesters of, by far, less darkening than those from the conventional antimony catalysts. However, the darkening of polyesters obtained in the latter case is, of course, somewhat serious in comparison with that of the case where the pentavalent phosphorus compounds are used. Further, various additives such as stabilizer, pigment, delustrant and the like may be employed in the polycondensation.

According to our investigation, polyesters, which have been prepared by the use of conventional antimony compounds such as antimony trioxide and antimony acetate, usually contains 80 to 85% by weight, based upon the total weight of catalytic antimony compounds having been added, of residual antimony compounds. Among the residual antimony compounds, amounts of metallic antimony, which has been formed by the reduction through polycondensation, usually exceeds 20% by molar number percentage based upon the molar number of antimony atoms contained in the antimony compounds having been added. On the contrary, amounts of the reduced metallic antimony contained in polyesters which have been prepared by the method of the present invention, may be regulated with ease to be below 20% by molar number percentage and in many cases, below 10%.

To sum up, it may be said that a method according to the present invention produces polyesters, possessing, by far, less darkness in comparison with those of conventional antimony catalyts, e.g. antimony trioxide and antimony acetate, with a high productivity. These facts are surprising. The causes remaining unexplained are revealed, but it may be presumed that the less darkening of polyesters is due to the fact that the catalytic antimony compound of the present invention has at least on heterocyclic 5–7 membered ring exhibiting a high heat stability in its molecule, and that the high productivity of polyesters is due to the fact that amounts of antimony reduced during polycondensation are less than that in the case of conventional antimony trioxide or antimony acetate and therefore, an actually effective concentration of the antimony catalyst of the present invention is high.

The invention will be further illustrated with reference to examples, in which "parts" and "percent" are both "by weight" unless otherwise specified and intrinsic viscosity $[\eta]$ of polymers was determined in a mixture solvent of tetrachloro ethane and phenol (1:1) at a temperature of 25° C., and content of diethylene glycol (DEG) in polymers was determined by gas chromatography of hydrolyzed polymers.

Both luminous reflectance, represented by Y value, and excitation purity, represented by PI value, of polymers were determined as follows; the sample polymer was spun and drawn in a normal manner to form filaments having a fineness of 75 d./36 fils. The filament test specimen was illuminated by a substantially unidirectional beam in an automatic recording spectrophotometer (manufactured by Hitachi Seisakusho, Japan; Model EPR-2). Reflectance was measured on the test specimen and the magnesium oxide standard white surface, the latter being used as a standard.

EXAMPLE 1

10,000 parts of dimethyl terephthalate and 7,500 parts of ethylene glycol were heated at temperatures of 150 to 250° C. under an atmosphere of nitrogen in the presence of 5 parts of calcium acetate to effect ester-interchange while methanol, thus produced, was continuously distilled off from the reaction mixture. The reaction was completed three hours after its initiation. The reaction product was then distilled by heating to remove an excess of unreacted ethylene glycol therefrom.

An antimony tartrate compound was prepared by reacting antimony triethoxide and tartaric acid with each other in ethanol in a molar proportion of the triethoxide to the acid being 2:1. The results of the elementary analysis almost agreed with the theoretical values calculated from the formula $(C_2H_5O—Sb)_2(C_4H_2O_6)$, was shown below.

Elements.—Measured value (percent): C, 19.92; H, 2.38; Sb, 50.59. Calculated value (percent): C, 20.00; H, 2.50; Sb, 50.83.

8.2 parts of the antimony tartrate compound (Sb content of which corresponds to 5 parts of $Sb_2O_3$) and 2.3 parts of trimethyl phosphate were added to bis-β-hydroxyethylterephthalate, produced as mentioned above. The mixture was vacuumed to diminish pressure by degrees and finally, polycondensed at a temperature of 285° C. and a pressure of 2 mm. Hg for two hours.

The resultant polymer had a melting point of 260° C. and an intrinsic viscosity $[\eta]$ of 0.727. The polymer was transparent with a very slightly yellow tinge but little or no darkening. Filaments, obtained therefrom by spinning and drawing, were characterized as having a Y value of 87.5% and a PI value of 98.4% and exhibiting excellent whiteness and luster.

CONTROL EXAMPLE 1

Polycondensation between dimethyl terephthalate and ethylene glycol was performed under the same conditions as those of Example 1 except that the antimony tartrate compound in Example 1 was replaced by 5 parts of antimony trioxide.

The resultant polymer exhibited dark grey and a melting point of 260.5° C. and an intrinsic viscosity $[\eta]$ of 0.667, showing that the polycondensation rate was somewhat lower than that in Example 1. Filaments, obtained therefrom, were characterized as having a Y value of 79.3% and a PI value of 99.2% and exhibiting a considerably great darkness in comparison with those of Example 1.

CONTROL EXAMPLE 2

Polycondensation was repeated under the same conditions as those in Example 1 except that 11.4 parts of tartar emetic (Sb content of which corresponds to 5 parts of $Sb_2O_3$) were added in place of the antimony tartrate compound of Example 1. A violent frothing in the reaction mixture was observed during the polycondensation.

The resultant polymer was tinged with blackish yellow-green and contained some coarse particles looking dark grey, which appeared to be metallic antimony agglomerates. The polymer had a melting point of 260° C. and an intrinsic viscosity $[\eta]$ of 0.673, showing that the polycondensation rate was almost similar to that in Control Example 1 and somewhat lower than that in Example 1.

While spinning and drawing, filament breakage were often observed. Filaments, thus obtained, were characterized as having a Y value of 74.8% and a PI value of 88.7% and possessed distinctly yellow and dark colors, which were extremely inferior to those of Example 1.

EXAMPLE 2

Polycondensation was repeated under the same conditions as those in Example 1 except that 9 parts of antimony tartrate compound having the formula $$C_2H_5O—Sb(C_4H_4O_6)$$

(Sb content of which corresponds to 5 parts of $Sb_2O_3$) was used in place of the antimony tartrate compound of Example 1.

The resultant polymer had a melting point of 261° C. and an intrinsic viscosity $[\eta]$ of 0.734. It was tinged with a faint yellow but little or no darkening and transparent. Filaments, obtained therefrom, were characterized as having a Y value of 86.5% and a PI value of 97.8% and being distinctly lustrous.

EXAMPLE 3

The antimony compound having the formula $$(C_2H_5O—Sb)_2—(C_4H_2O_6),$$

being the same as that used in Example 1, was heated at temperatures of 80 to 100° C. in water for two minutes to obtain a partially hydrolyzed product represented by the formula $(C_4H_2O_6)Sb_2O$. Results of the elementary analysis of the product are shown below.

Elements.—Measured value (percent): C, 11.52; H, 0.82; Sb, 59.75. Calculated value (percent): C, 11.82; H, 0.49; Sb, 60.10.

Using the hydrolyzed product in amounts of 7 parts (Sb content of which corresponds to 5 parts of $Sb_2O_3$) in place of the antimony tartrate compound of Example 1, polycondensation of Example 1 was performed with all other conditions remaining the same.

The resultant polymer had a melting point of 261.3° C. and an intrinsic viscosity $[\eta]$ of 0.737. It was light and transparent with a very slightly yellow tinge. Filaments, obtained therefrom, were characterized as having a Y value of 88.9% and a PI value of 99.0% and being distinctly lustrous.

EXAMPLE 4

Polycondensation was performed under the same conditions as those in Example 1 except that 5.9 parts of an antimony tartrate compound having the formula $$(C_6H_5O—Sb)_2—(C_4H_2O_6)$$

(Sb content of which corresponds to 3 parts of $Sb_2O_3$, and results of elementary analysis of which compound were Sb 42.83% as practically measured value in comparison with Sb 42.36% as theoretical value calculated from the above formula) was used in place of the antimony compound having the formula $$(C_2H_5O-Sb)_2(C_4H_2O_6)$$

in Example 1.

The resultant polymer had a melting point of 260° C. and an intrinsic viscosity [η] of 0.656 and was almost colorless and transparent. Filaments, obtained therefrom, were characterized as having a Y value of 88.9% and a PI value of 99.0% and exhibiting distinct luster and excellent whiteness.

EXAMPLE 5

An antimony malate compound having the formula $$Sb(C_4H_3O_5)$$

(results of elementary analysis of which compound, were Sb 48.2% as practically measured value in comparison with Sb 48.22% as theoretical value calculated from the formula) was prepared by reacting equimolar amounts of antimony triethoxide and malic acid in ethanol in the same manner as that described hereinbefore.

Using 8.7 parts of the antimony malate compound (Sb content of which corresponds to 5 parts of $Sb_2O_3$) in replace of the antimony compound having the formula $$(C_2H_5O-Sb)_2(C_4H_2O_6)$$

of Example 1, polycondensation of Example 1 was performed with all other conditions remaining the same.

The resultant polymer had a melting point of 260° C. and an intrinsic viscosity [η] of 0.789 and was light with very slightly yellow tinge but little or no darkening. Filaments, obtained therefrom, were characterized as having a Y value of 88.9% and a PI value of 98.7% and exhibiting excellent luster and whiteness.

EXAMPLE 6

9,000 parts of dimethyl terephthalate, 1,000 parts of dimethyl isophthalate and 7,500 parts of ethylene glycol were mixed and 8 parts of magnesium acetate were added to the mixture at a temperature of 150° C. The resultant mixture was then heated at temperatures of 150 to 220° C. for three hours to effect ester-interchange. The reaction product was then distilled by heating at a temperature of 240° C. to remove an excess of unreacted ethylene glycol therefrom.

To the reaction product, a solution, which had been prepared by reacting 4.2 parts of trimethyl phosphate with 100 parts of ethylene glycol at a temperature of 175° C. while methanol, thus produced, was continuously distilled off, and 5.2 parts of an antimony malate having the formula $Sb(C_4H_3O_5)$ (Sb content of which corresponds to 3 parts of $Sb_2O_3$) were added at 240° C. The mixture was then heated while diminishing pressure by degrees and, finally, polycondensed at a temperature of 285° C. under a reduced pressure of 2 mm. Hg for two hours.

The resultant polymer was almost colorless and transparent and had an intrinsic viscosity [η] of 0.662. Filaments, obtained therefrom, were characterized as having a Y value of 89.8% and a PI value of 99.4% and exhibiting excellent whiteness and luster.

EXAMPLE 7

10,000 parts of dimethyl terephthalate and 7,500 parts of ethylene glycol were heated at temperatures of 150 to 220° C. under an atmosphere of nitrogen in the presence of 8 parts magnesium acetate to effect ester-interchange while methanol, thus produced, was continuously distilled off. The esterinterchange was completed 2.5 hours later from its initiation. The reaction product was then distilled by heating to remove an excess of unreacted ethylene glycol therefrom.

To the resultant product, 100 parts of a solution of 4.2 parts trimethyl phosphate dissolved in ethylene glycol and then, 12.2 parts of an antimony citrate compound having the formula $C_2H_5O-Sb(C_6H_6O_7)$ (Sb content of which corresponds to 5 parts of $Sb_2O_3$) were added at a temperature of 240° C. The antimony citrate compound had been prepared by reacting equi-molar amounts of antimony triethoxide and citric acid with each other in ethanol, results of elementary analysis of which compound were as follows: Sb percent=34.59 (34.17); C percent=23.74 (23.53); H percent=3.30 (3.08), wherein numerals in parentheses indicate theoretical values calculated from the above formula $C_2H_5O-Sb(C_6H_6O_7)$.

The above mixture was heated while diminishing pressure by degrees and finally, polycondensed under the same conditions as those in Example 6.

The resultant polymer was transparent with a very slightly yellow tinge but less darkening. It had a meltpoint of 260° C. and an intrinsic viscosity [η] of 0.722. Filaments, obtained therefrom, were characterized as having a Y value of 88.3% and a PI value of 98.6% and exhibiting excellent luster and whiteness.

EXAMPLE 8

An antimony citrate compound having the formula $(C_2H_5O)_2Sb_2(C_6H_4O_7)$ was prepared by reacting antimony triethoxide with citric acid in molar proportions of the triethoxide to the acid being 2:1. Results of elementary analysis of the antimony citrate compound were as follows: Sb percent=47.14 (46.74); C percent=22.63 (22.99); H percent=2.47 (2.68), wherein numerals in parentheses indicated theoretical values calculated from the above formula $(C_2H_5O)_2Sb_2(C_6H_4O_7)$.

Using 8.9 parts of the above antimony citrate compound (Sb content of which corresponds to 5 parts of $Sb_2O_3$) in place of the antimony citrate compound of Example 7, polycondensation of Example 7 was performed with all other conditions remaining the same.

The resultant polymer had a melting point of 260.5° C. and an intrinsic viscosity [η] of 0.717 and was transparent with a very slightly yellow tinge, but no darkness. Filaments, obtained therefrom, were characterized as having a Y value of 87.8% and a PI value of 98.6% and exhibiting excellent luster and brightness.

EXAMPLE 9

A partially hydrolyzed product having the formula $[(C_6H_6O_7)Sb]_2O$ was prepared by hydrolyzing the antimony citrate compound of Example 7. Results of elementary analysis of the hydrolyzed product were as follows: Sb percent=38.53 (38.13); C percent=22.88 (22.50); H percent=2.11 (1.88), wherein numerals in parentheses were a theoretical value calculated from the above formula $[(C_6H_6O_7)Sb]_2O$.

Using 6.6 parts of the hydrolyzed product (Sb content of which corresponds to 3 parts of $Sb_2O_3$) in place of the antimony citrate compound of Example 7, polycondensation of Example 7 was performed with all other conditions remaining the same.

The resultant polymer had a melting point of 260° C. and an intrinsic viscosity [η]of 0.656 and was transparent without a tinge of any color. Filaments, formed therefrom, were characterized as having a Y value of 89.8% and a PI value of 99.3% and exhibiting excellent luster and whiteness.

EXAMPLE 10

10,000 parts of dimethyl terephthalate and 7,500 parts of ethylene glycol were heated at temperatures of 150 to 220° C. under an atmosphere of nitrogen in the presence of 6 parts of magnesium acetate to effect ester-interchange while methanol, thus produced, was continuously distilled off the reaction mixture. The reaction was completed three hours later from its initiation. The reaction product was then distilled by further heating to remove an excess of unreacted ethylene glycol therefrom.

To the reaction product, a solution was added, which solution had been prepared by reaching 3.2 parts of trimethyl phosphate with 100 parts of ethylene glycol at a temperature of 175° C. while methanol, thus produced, was distilled off. Further, to the mixture, 9.8 parts of an antimony citrate compound having the formula $$C_2H_5O-Sb(C_6H_6O_7)$$

(Sb content of which corresponds to 4 parts of $Sb_2O_3$), which compound had been prepared by reacting equimolar amounts of antimony triethoxide and citric acid with each other in ethanol, and a solution of 0.2 part of amorphous germanium dioxide dissolved in 20 parts of ethylene glycol was added. The mixture was heated while diminishing pressure by degrees and finally, polycondensed at a temperature of 280° C. and a reduced pressure of 2 mm. Hg for two hours.

The resultant polymer had an intrinsic viscosity [$\eta$] of 0.766 and DEG of 0.60% and was colorless and transparent. Filaments, formed therefrom, were characterized as having a Y value of 90.6% and a PI value of 99.7% and exhibiting excellent whiteness and luster.

EXAMPLE 11

Polycondensation was performed under the same conditions as those in Example 10 except that the amorphous germanium dioxide of Example 10 was not employed.

The resultant polymer had an intrinsic viscosity [$\eta$] of 0.706 and DEG of 0.60% and was tinged with a less dark but slightly yellow color. Filaments formed therefrom, were characterized as having a Y value of 87.7% and a PI value of 98.4% and exhibiting excellent whiteness but a somewhat yellowish color in comparison with those in Example 10.

EXAMPLE 12

Using 7.1 parts of an antimony citrate compound having the formula $(C_2H_5O)_2Sb_2(C_6H_4O_7)$ (Sb content of which corresponds to 4 parts of $Sb_2O_3$), which had been prepared by reacting antimony triethoxide with citric acid in a molar proportion of the triethoxide to the acid being 2:1, in place of the antimony citrate compound having the formula $C_2H_5O-Sb(C_6H_6O_7)$ of Example 10, polycondensation of Example 10 was performed with all other conditions remaining the same.

The resultant polymer had an intrinsic viscosity [$\eta$] of 0.772 and DEG of 0.58% and was colorless and transparent. Filaments, formed therefrom, were characterized as having a Y value of 90.8% and a PI value of 99.5% and exhibiting excellent whiteness and luster.

EXAMPLE 13

Using 7 parts of an antimony malate compound having the formula $Sb(C_4H_3O_5)$ (Sb content of which corresponds to 4 parts of $Sb_2O_3$), which had been prepared by reacting equimolar amounts of antimony triethoxide and malic acid with each other in ethanol, in place of the antimony citrate compound of Example 10, polycondensation of Example 10 was performed with all other conditions remaining the same.

The resultant polymer had an intrinsic viscosity [$\eta$] of 0.789 and DEG of 0.60% and was colorless and transparent. Filaments, formed therefrom, were characterized as having a Y value of 91.3% and a PI value of 99.6% and exhibiting excellent whiteness and luster.

EXAMPLE 14

Using 6.6 parts of an antimony tartrate compound having for formula $(C_2H_5O-Sb)_2(C_4H_2O_6)$ (Sb content of which corresponds to 4 parts of $Sb_2O_3$), which had been prepared by reacting antimony triethoxide with tartaric acid in ethanol in molar proportions of the triethoxide to the acid being 2:1, in place of the antimony citrate compound of Example 10, polycondensation of Example 10 was performed with all other conditions remaining the same.

The resultant polymer had an intrinsic viscosity [$\eta$] of 0.768 and DEG of 0.58% and was colorless and transparent. Filaments, formed therefrom, were characterized as having a Y value of 90.8% and a PI value of 99.4% and exhibiting excellent whiteness and luster.

EXAMPLES 15–17

Polycondensations of Examples 12–14 were performed under the same conditions as those in Examples 12–14, respectively, except that amorphous germanium dioxide was not employed.

Characteristics of the resultant polymer and filaments are shown in Table I.

TABLE I

| Example No. | [$\eta$] | DEG (percent by weight) | Y value (percent) | PI value (percent) | Color tone of polymer |
|---|---|---|---|---|---|
| 15 | 0.715 | 0.61 | 87.6 | 98.5 | Slightly yellowish green. |
| 16 | 0.721 | 0.58 | 88.5 | 98.6 | Do. |
| 17 | 0.705 | 0.59 | 87.9 | 98.2 | Do. |

EXAMPLE 18

Using a solution, which was prepared by heating, while stirring, a mixture of 0.2 part of commercially available crystal germanium dioxide and 20 parts of ethylene glycol at a boiling point for three hours in the presence of 0.17 part of calcium acetate, in place of amorphous germanium dioxide of Example 13, polycondensation of Example 13 was performed with all other conditions remaining the same.

The resultant polymer had an intrinsic viscosity [$\eta$] of 0.761 and DEG of 0.58% and was colorless and transparent. Filaments, formed therefrom, were characterized as having a Y value of 90.8% and a PI value of 99.5% and exhibiting excellent whiteness and luster.

EXAMPLE 19

Using a 0.5% crystal germanium dioxide solution in ethylene glycol, which was prepared as mentioned below, in place of the amorphous germanium dioxide of Example 13, polycondensation of Example 13 was performed with all other conditions remaining the same. The germanium dioxide solution was prepared as follows: 0.2 part of commercially available crystal germanium dioxide was dissolved in 20 parts of water at a temperature of 100° C. After 50 parts of ethylene glycol was added to the solution, the mixture was distilled by heating to remove water and a part of ethylene glycol and to obtain a 0.5% germanium dioxide solution in ethylene glycol.

The resultant polymer had an intrinsic viscosity [$\eta$] of 0.787 and DEG of 0.61%. Filaments thereof were characterized as having a Y value of 90.0% and a PI value of 99.4% and exhibiting excellent whiteness and luster.

EXAMPLE 20

Using an 0.5% aqueous solution of commercially available germanium dioxide used in Example 19, and the antimony malate compound of Example 6, polycondensation of Example 6 was performed with all other conditions remaining the same.

The resultant polymer had an intrinsic viscosity [$\eta$] of 0.767 and DEG of 0.62%. Filaments, formed therefrom, were characterized as having a Y value of 90.1% and a PI value of 99.1% and exhibiting excellent whiteness and luster.

EXAMPLE 21

10,000 parts of dimethyl terephthalate and 7,500 parts of ethylene glycol were heated at temperatures of 150 to 220° C. under an atmosphere of nitrogen for three hours in the presence of 3 parts of manganese acetate to effect ester-interchange. After the reaction product was distilled by heating to remove an excess of unreacted ethylene glycol therefrom, a solution was added to the product at a temperature of 240° C. which solution had been prepared by reacting 2 parts of trimethyl phosphate with 100 parts of ethylene glycol at a temperature of 170° C.

Further, to the mixture, 6.1 parts of an antimony citrate compound having the formula $(C_6H_4O_7)Sb_2O$ (Sb content of which corresponds to 4 parts of $Sb_2O_3$), which had been prepared by reacting antimony triethoxide with citric acid in ethanol in molar proportions of the triethoxide to the acid being 2:1 and then, hydrolyzing the product in hot water, and a solution, which had been prepared by heating a mixture of 0.3 parts of finely powdered crystal germanium dioxide having an average particle diameter of 2.44μ and 30 parts of ethylene glycol at a boiling point to dissolve the same, were added. The mixture was heated while diminishing pressure by degrees and, finally, polycondensed at a temperature of 280° C. and a reduced pressure of 2 mm. Hg for two hours.

The resultant polymer had an intrinsic viscosity [η] of 0.779 and DEG of 0.62% and was extremely white. Filaments, formed therefrom, were characterized as having a Y value of 90.8% and a PI value of 99.6% and exhibiting excellent whiteness and luster.

For a purpose of comparison, the above example was repeated wherein the finely powdered crystal germanium dioxide was not employed with all other conditions remaining the same.

The resultant polymer had an intrinsic viscosity [η] of 0.710 and DEG of 0.61%. Filaments, formed therefrom, were characterized as having a Y value of 87.9% and a PI value of 98.4% and being very slightly yellow tinged.

EXAMPLE 22

Polycondensation was performed under the same conditions as those in Example 21 except that 0.7 part of germanium tetraethoxide was substituted for the finely powdered crystal germanium dioxide of Example 21.

The resultant polymer had an intrinsic viscosity [η] of 0.770 and DEG of 0.62%. Filaments, formed therefrom, were characterized as having a Y value of 91.3% and a PI value of 99.5% and exhibiting excellent whiteness and luster.

EXAMPLE 23

A solution, which was prepared by reacting 3.2 parts of trimethyl phosphate with 100 parts of ethylene glycol at a temperature of 170° C., was added to an ester-interchange reaction product, which was produced by effecting ester-interchange under the same conditions as those in Example 10.

To the mixture, a solution of 5.2 parts of an antimony malate compound having the formula $Sb(C_4H_3O_5)$ (Sb content of which corresponds to 3 parts of $Sb_2O_3$) in 150 parts of ethylene glycol and a solution of 2 parts of amorphous germanium dioxide in 100 parts of ethylene glycol were added. The mixture was heated while diminishing pressure by degrees and finally, polycondensed at a temperature of 280° C. and a reduced pressure of 2 mm. Hg for one hour.

The resultant polymer had an intrinsic viscosity [η] of 0.741 and DEG of 0.95% and was colorless and transparent. Filaments, formed therefrom, were characterized as having a Y value of 91.4% and a PI value of 99.7% and exhibiting excellent whiteness and luster.

CONTROL EXAMPLE 3

For the purpose of comparison, polycondensation was performed under the same conditions as those in Example 23 except for using only 2 parts of amorphous germanium dioxide as a polycondensation catalyst and not using the antimony malate compound of Example 23.

The resultant polymer had an intrinsic viscosity [η] of 0.609 and DEG of 1.22%, showing that considerable amounts of diethylene glycol was inevitably formed and productivity of the desired polymer was low. Filaments, formed therefrom, were characterized as having a Y value of 91.5% and a PI value of 99.6% and exhibiting excellent whiteness and luster.

EXAMPLE 24

An antimony benzilate compound having the formula $C_2H_5O-Sb[O-C(C_6H_5)_2COO]$ was prepared by reacting equimolar amounts of antimony triethoxide and benzilic acid with each other in ethanol. Elementary analysis of the compound showed that Sb content was 30.88% in comparison to the theoretical content calculated from the above formula being 31.10%.

Using 13.5 parts of the benzilate compound (Sb content of which corresponds to 5 parts of $Sb_2O_3$) in place of the antimony tartrate compound of Example 1, polycondensation of Example 1 was repeated with all other conditions remaining the same.

The resultant polymer had an intrinsic viscosity [η] of 0.740 and a melting point of 260° C. and was light with a slightly yellow but no dark tinge. Filaments, formed therefrom, were characterized as having a Y value of 88.7% and a PI value of 98.6% and exhibiting excellent whiteness and luster.

EXAMPLE 25

Using 10.1 parts of an antimony itaconate compound having the formula

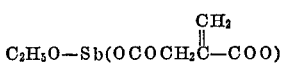

(Sb content of which corresponds to 5 parts of $Sb_2O_3$) in place of the antimony tartrate compound of Example 1, polycondensation of Example 1 was repeated with all other conditions remaining the same.

The resultant polymer had a melting point of 261° C. and intrinsic viscosity [η] of 0.776 was transparent with a very slightly yellow but no dark tinge. Filaments, formed therefrom, were characterized as having a Y value of 89.4% and a PI value of 98.8% and exhibiting excellent whiteness and luster.

EXAMPLES 26–53

Using antimony itaconate compounds, which were prepared by reacting antimony triethoxide with itaconic acid in various molar proportions, and various antimony α,β-dicarboxylate compounds, which were also prepared from antimony triethoxide and other α,β-dicarboxylic acids, polycondensations were repeated under the same conditions as those in Example 7. Results are shown together in Table II.

As apparent from Table II, antimony α,β-dicarboxylate compounds prepared from approximately equimolar amounts of antimony triethoxide and α,β-dicarboxylic acid result in polymers possessing the most excellent color tone. Further, it has been observed that the darkening of polymers increases by degrees with a decrease of the molar proportion of the triethoxide to the acid below a 1:1 ratio and that the yellow formation in polymers increases by degrees with an increase of the molar proportion in excess of a 1:1 ratio.

TABLE II

| Example No. | α,β-Dicarboxylic acid (A) | Molar ratio (A)/Sb(OC₂H₅)₃ | Amounts of catalyst[a] (parts) | [η] | Y value (percent) | PI value (percent) |
|---|---|---|---|---|---|---|
| 26 | Itaconic acid | 0.5 | (b) | 0.728 | 84.8 | 99.2 |
| 27 | do | 2 | 13 | 0.781 | 88.4 | 98.6 |
| 28 | do | 3 | (b) | 0.772 | 86.5 | 98.0 |
| 29 | do | 5 | (b) | 0.755 | 84.2 | 97.4 |
| 30 | Succinic acid | 1 | 9.7 | 0.771 | 85.7 | 98.8 |
| 31 | do | 3 | (b) | 0.773 | 84.7 | 98.1 |
| 32 | Cyclohexane-1,2-dicarboxylic acid | 1 | 11.5 | 0.782 | 88.4 | 98.8 |
| 33 | do | 3 | (b) | 0.777 | 85.5 | 98.4 |
| 34 | Cyclobutane-1,2-dicarboxylic acid | 1 | 10.6 | 0.769 | 87.8 | 98.9 |
| 35 | do | 3 | (b) | 0.772 | 86.1 | 98.6 |
| 36 | Oxalacetic acid | 1 | 10.2 | 0.782 | 87.4 | 98.4 |
| 37 | do | 3 | (b) | 0.770 | 83.8 | 97.6 |
| 38 | Maleic acid | 0.5 | (b) | 0.716 | 85.6 | 98.9 |
| 39 | do | 1 | 9.3 | 0.788 | 89.2 | 98.8 |
| 40 | do | 2 | 12 | 0.772 | 88.6 | 98.8 |
| 41 | do | 5 | (b) | 0.768 | 86.0 | 97.5 |
| 42 | Dimethylmaleic acid | 1 | 9.8 | 0.773 | 88.7 | 98.9 |
| 43 | do | 3 | (b) | 0.768 | 87.8 | 98.2 |
| 44 | Fumaric acid | 0.2 | (b) | 0.689 | 83.1 | 98.5 |
| 45 | do | 0.5 | (b) | 0.730 | 85.9 | 98.5 |
| 46 | do | 1 | 9.3 | 0.780 | 90.0 | 98.7 |
| 47 | do | 3 | (b) | 0.773 | 86.7 | 98.3 |
| 48 | Phthalic acid | 1 | 11.3 | 0.750 | 86.9 | 99.0 |
| 49 | do | 3 | (b) | 0.756 | 86.4 | 98.8 |
| 50 | Trimellitic acid | 1 | (b) | 0.759 | 86.6 | 98.8 |
| 51 | do | 2 | (b) | 0.766 | 85.8 | 98.8 |
| 52 | Pyromellitic acid | 0.5 | (b) | 0.771 | 87.8 | 98.9 |
| 53 | do | 1 | (b) | 0.769 | 87.2 | 98.8 |
| Control 4 | | | [c] 5 | 0.659 | 79.4 | 98.2 |

[a] Sb content of the catalyst compound corresponds to 5 parts of Sb₂O₃.
[b] As catalysts, powdered products, which were prepared by distilling a reaction prouct of 8.8 parts of Sb-(OC₂H₅)₃ (Sb content of which corresponds to 5 parts of Sb₂O₃) with A,x-dicarboxylic acid to remove solvent therefrom, were used as they were. An infrared absorption spectrum of the products was characterized by the strong absorption band at approximatly 1,630⁻¹ cm., being due to the carboxyl group combined with Sb atom.
[c] As a catalyst, only Sb₂O₃ was used.

What we claim is:

1. A process for preparing linear polyesters comprising condensing a glycol terephthalate in which the glycol portion has a 2–16 carbon atoms in the presence of a catalytic amount of at least one catalytic anitmony compound selected from the group consisting of condensed products between at least one member selected from an α-hydroxycarboxylic acid having 2 to 30 carbon atoms and an α,β-dicarboxylic acid having 4 to 30 carbon atoms, and an antimony compound represented by the following formula Sb(OR₁)(OR₂)(OR₃) wherein R₁, R₂ and R₃ are identical with or different from each other and are hydrogen atom or alkyl, acyl, hydroxyalkyl or substituted or unsubstituted aryl group, said alkyl, acyl and hydroxyalkyl groups having 1 to 18 carbon atoms and said aryl groups having 6 to 18 carbon atoms; or partially hydrolyzed products of said condensed products, the ratio of antimony atoms contained in said antimony compound to the acid units present being from about 2.0 to about ⅓, said α,β-dicarboxylic acid being selected from the group consisting of the compounds represented by the following formulae:

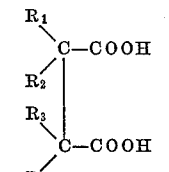

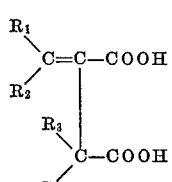

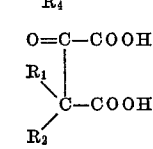

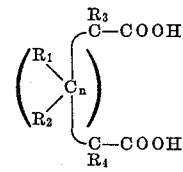

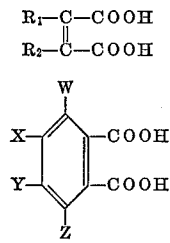

wherein R₁, R₂, R₃ and R₄ are identical with or different from each other and are hydrogen atom or unsubstituted or substituted alkyl, cycloalkyl, aryl, aralkyl, allyl or alkoxyl group; said substituted groups having a substituent selected from carbonyl group, halogen and carboxyl groups; W, X, Y and Z are identical with or different from each other and are hydrogen atom or alkyl, hydroxyl or carboxyl group; and n is an integer of at least 1.

2. A process according to claim 1, wherein said α-hydroxycarboxylic acid having 2 to 30 carbon atoms has a total of at least three hydroxyl and carboxyl groups or has at least one aromatic ring in the α-position in relation to the carboxyl group.

3. A process according to claim 2, wherein said α-hydroxycarboxylic acid is malic acid, α-methylmalic acid, citric acid, tartaric acid, α-methyltartaric acid, α-hydroxy-α'-methyl succinic acid, α-hydroxyglutaric acid, glyceric acid, α,β-dihydroxyisobutyric acid, dihydroxyfumaric acid, gluconic acid, tartronic acid, benzilic acid or α-phenyllactic acid.

4. A process according to claim 1, wherein said α-hydroxycarboxylic acid is glycolic acid, α-hydroxystearic acid or α-hydroxyisobutyric acid.

5. A process according to claim 1, wherein said α,β-dicarboxylic acid is maleic acid, dimethylmaleic acid, phenylmaleic acid, fumaric acid, succinic acid, methyl succinic acid, α-ethoxysuccinic acid, 2,3-dimethylsuccinic acid, 2,3-dimethylsuccinic acid, 2-methyl-3-ethylsuccinic acid, tetramethylsuccinic acid, phenylsuccinic acid, cyclohexylsuccinic acid, itaconic acid, cyclohexane-1,2-dicarboxylic acid, 1-phenylcyclopropane-2,3-dicarboxylic acid, cyclobutane-1,2-dicarboxylic acid, cyclopentane-1,2-dicarboxylic acid, cyclohexane-1,2-dicarboxylic acid, oxalacetic acid, phthalic acid, 3-methylphthalic acid, 4,5-dimethylphthalic acid, 4-hydroxyphthalic acid, trimellitic acid, 1-butene-2,3,4-tricarboxylic acid or pyromellitic acid.

6. A process according to claim 1, wherein said molar proportion of antimony atom contained in said antimony compound represented by the formula $$Sb(OR_1)(OR_2)(OR_3)$$

to said α-hydroxycarboxylic acid unit and/or said α,β-dicarboxylic acid unit is 1:1.

7. A process according to claim 1, wherein from 0.005 to 0.5% by weight of said catalytic antimony compound, based on the weight of the resulting polyester, is present.

8. A process according to claim 1, wherein said catalytic antimony compound is present as a solution or slurry in ethylene glycol or a solid form.

9. A process according to claim 1, wherein at least one catalytic metal compound selected from soluble germanium, titanium, tin, silicon, lead and zinc compounds is present in addition to said catalytic antimony compound.

10. A process according to claim 9, wherein said germanium compound is amorphous or crystal germanium dioxide, an eutectic mixture of crystal germanium dioxide and antimony trioxide, germanium alkoxide, germanium carboxylate or germanium tetrahalide and is used in the form of a solid, an aqueous solution, an ethylene glycol solution being prepared by replacing the medium of the aqueous solution by ethylene glycol or by directly dissolving the germanium compound in ethylene glycol in the presence of alkali metal salt or alkaline earth metal salt.

11. A process according to claim 1, wherein said glycol terephthalate is selected from ethylene glycol, terephthalate 1,4-butanediol terephthalate and 1,4 - cyclohexanedimethanol terephthalate.

12. A process according to claim 1, wherein said glycol terephthalate is condensed together with minor amounts of at least one polycondensation component selected from phthalates, isophthalates, adipates, succinates and 4-β-oxyethoxybenzoates, of ethylene glycol, 1,4-butanediol or 1,4-cyclohexanedimethanol.

13. A process for preparing linear polyesters comprising condensing glycol terephthalate in which the glycol portion has 2–16 carbon atoms in the presence of a catalytic amount of at least one catalytic antimony compound selected from the group consisting of condensed products between an antimony compound represented by the following formula $Sb(OR_1)(OR_2)(OR_3)$ wherein $R_1$, $R_2$ and $R_3$ are identical with or different from each other and are hydrogen atom or alkyl, acyl, hydroxyalkyl or substituted or unsubstituted aryl group, said alkyl, acyl and hydroxyalkyl groups having 1 to 18 carbon atoms and said aryl groups having 6 to 18 carbon atoms, and at least one member selected from malic acid, citric acid, tartaric acid, α-methyltartaric acid, benzilic acid, glycolic acid, α-hydroxystearic acid, α-hydroxyisobutyric acid, maleic acid, dimethylmaleic acid, fumaric acid, succinic acid, α-ethoxysuccinic acid, itaconic acid, phthalic acid, cyclohexane-1,2-dicarboxylic acid, cyclobutane-1,2-dicarboxylic acid, oxalacetic acid, trimellitic acid and pyromellitic acid, or partially hydrolyzed products of said condensed products, the ratio of antimony atoms contained in said antimony compound to acid units present being from about 2.0 to about ⅓.

References Cited

UNITED STATES PATENTS

| | | | |
|---|---|---|---|
| 3,438,944 | 4/1969 | Stewart et al. | 260—75 |
| 3,475,381 | 10/1969 | Price et al. | 260—75 |
| 3,484,410 | 12/1969 | Lazarus et al. | 260—75 |
| 3,536,667 | 10/1970 | Stewart et al. | 260—75 |

OTHER REFERENCES

Gate et al.: J. Inorg. Nucl. Chem. 23, 257–63 (1961).

MELVIN GOLDSTEIN, Primary Examiner

U.S. Cl. X.R.

260—446

UNITED STATES PATENT OFFICE
CERTIFICATE OF CORRECTION

Patent No. 3,732,182      Dated May 8, 1973

Inventor(s)  KAZUYA CHIMURA ET AL

It is certified that error appears in the above-identified patent and that said Letters Patent are hereby corrected as shown below:

Column 4, lines 3-8, change the formula to:

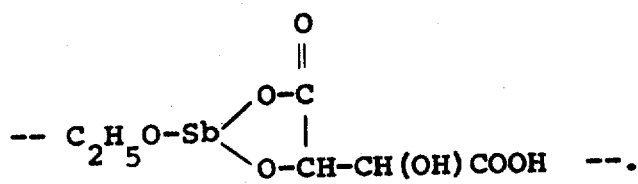

Column 4, lines 31-35, change the formula to:

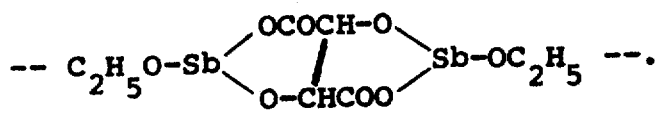

Column 4, line 48, change the formula "$C_2H_5O-Sb(C_4H_4O)$" to

-- $C_2H_5O-Sb(C_4H_4O_6)$ --.

UNITED STATES PATENT OFFICE
CERTIFICATE OF CORRECTION

Patent No. 3,732,182　　　　　Dated May 8, 1973

Inventor(s) KAZUYA CHIMURA ET AL　　　　Page - 2

It is certified that error appears in the above-identified patent and that said Letters Patent are hereby corrected as shown below:

Column 5, lines 52 - 60, change the formula to:

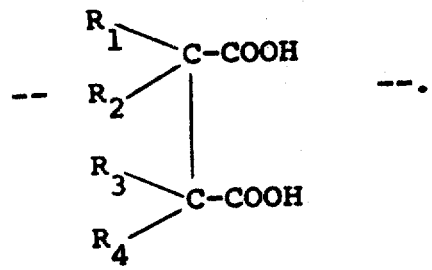

Column 7, lines 6 - 12, change the formula to:

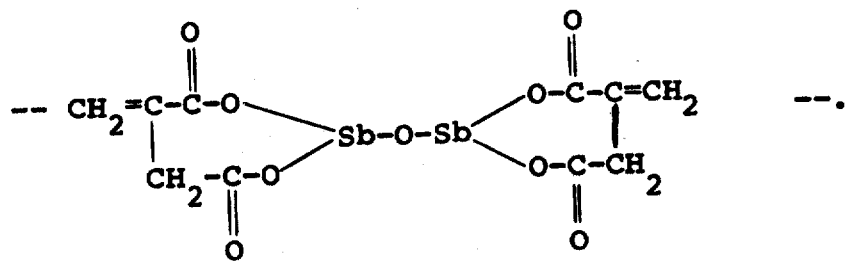

UNITED STATES PATENT OFFICE
CERTIFICATE OF CORRECTION

Patent No. 3,732,182　　　　　　　　Dated May 8, 1973

Inventor(s) KAZUYA CHIMURA ET AL　　　　Page - 3

It is certified that error appears in the above-identified patent and that said Letters Patent are hereby corrected as shown below:

Column 18, lines 34 - 40, change the formula to:

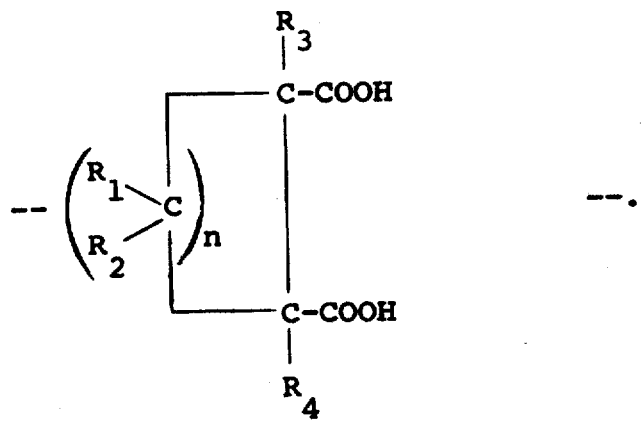

Column 19, line 41, delete "," (comma) after "ethylene glycol".

Signed and sealed this 20th day of August 1974.

(SEAL)
Attest:

McCOY M. GIBSON, JR.　　　　　　　C. MARSHALL DANN
Attesting Officer　　　　　　　　　Commissioner of Patents